United States Patent [19]
Vinson et al.

[11] Patent Number: 5,944,954
[45] Date of Patent: Aug. 31, 1999

[54] PROCESS FOR CREPING TISSUE PAPER

[75] Inventors: Kenneth Douglas Vinson, Cincinnati; Howard Thomas Deason, Hamilton; Bart Steven Hersko, Cincinnati, all of Ohio

[73] Assignee: The Procter & Gamble Company, Cincinnati, Ohio

[21] Appl. No.: 08/795,738

[22] Filed: Feb. 5, 1997

Related U.S. Application Data

[63] Continuation-in-part of application No. 08/651,354, May 22, 1996, Pat. No. 5,865,950.

[51] Int. Cl.⁶ .......................................................... B31F 1/12
[52] U.S. Cl. ........................... 162/111; 162/112; 162/113; 264/283
[58] Field of Search .................... 162/111, 112, 162/113; 264/283, 282

[56] References Cited

U.S. PATENT DOCUMENTS

| | | | |
|---|---|---|---|
| 962,505 | 6/1910 | Funke et al. | 162/112 |
| 3,821,068 | 6/1974 | Shaw | 162/111 |
| 3,926,716 | 12/1975 | Bates | 162/113 |
| 3,994,771 | 11/1976 | Morgan, Jr. et al. | 162/113 |
| 4,064,213 | 12/1977 | Lazorisak et al. | 264/134 |
| 4,127,637 | 11/1978 | Pietreniak et al. | 264/114 |
| 4,158,594 | 6/1979 | Becker et al. | 162/112 |
| 4,166,001 | 8/1979 | Dunning et al. | 162/111 |
| 4,191,609 | 3/1980 | Trokhan | 162/113 |
| 4,300,981 | 11/1981 | Carstens | 162/109 |
| 4,308,092 | 12/1981 | Latimer et al. | 162/111 |
| 4,406,737 | 9/1983 | Latimer et al. | 162/111 |
| 4,501,640 | 2/1985 | Soerens | 162/111 |
| 4,528,316 | 7/1985 | Soerens | 524/503 |
| 4,529,480 | 7/1985 | Trokhan | 162/109 |
| 4,637,859 | 1/1987 | Trokhan | 162/109 |
| 4,788,243 | 11/1988 | Soerens | 524/503 |
| 4,940,513 | 7/1990 | Spendel | 162/112 |
| 4,994,146 | 2/1991 | Soerens | 162/112 |
| 5,143,776 | 9/1992 | Givens | 482/194 |
| 5,326,434 | 7/1994 | Careuic et al. | 162/111 |
| 5,382,323 | 1/1995 | Furman, Jr. et al. | 162/111 |
| 5,399,241 | 3/1995 | Oriaran et al. | 162/111 |
| 5,468,796 | 11/1995 | Chen et al. | 524/377 |
| 5,490,903 | 2/1996 | Chen et al. | |

FOREIGN PATENT DOCUMENTS

| | | | |
|---|---|---|---|
| WO 96/33310 | 10/1996 | WIPO | D21H 27/40 |
| WO 97/04166 | 2/1997 | WIPO | D21H 17/07 |

*Primary Examiner*—Peter Chin
*Attorney, Agent, or Firm*—Bart S. Hersko; Edward J. Milbrada; E. Kelly Linman

[57] ABSTRACT

An adhesive for applying to a creping surface in the process for dry creping tissue paper is disclosed. The adhesive comprises cationic starch and optionally a polyvinyl alcohol and a water-soluble, thermosetting, cationic polyamide-epihalohydrin resin. The adhesive provides high adhesion and doctorability for dry creping.

9 Claims, 1 Drawing Sheet

PROCESS FOR CREPING TISSUE PAPER

This is a Continuation in Part of application Ser. No. 08/651,354 filed on May 22, 1996, now U.S. Pat. No. 5,865,950.

TECHNICAL FIELD

This invention relates, in general, to creped tissue paper products and processes. More specifically, it relates to dry creped tissue papers wherein an embryonic paper web is formed on a fourdrinier or similar paper making apparatus, adhesively secured while semi-dry to a cylindrical drying drum whereupon the drying of the web is substantially completed, and creped from the drum by means of a flexible creping blade.

BACKGROUND OF THE INVENTION

Sanitary paper tissue products are widely used. Such items are commercially offered in formats tailored for a variety of uses such as facial tissues, toilet tissues and absorbent towels. The formats, i.e. basis weight, thickness, strength, sheet size, dispensing medium, etc. of these products often differ widely, but they are linked by the common process by which they originate, the so-called creped papermaking process.

Creping is a means of mechanically compacting paper in the machine direction. The result is an increase in basis weight (mass per unit area) as well as dramatic changes in many physical properties, particularly when measured in the machine direction. Creping is generally accomplished with a flexible blade, a so-called doctor blade, against a Yankee dryer in an on machine operation. This blade is also sometimes referred to as a creping blade or simply a creper.

A Yankee dryer is a large diameter, generally 8–20 foot drum which is designed to be pressurized with steam to provide a hot surface for completing the drying of papermaking webs at the end of the papermaking process. The paper web which is first formed on a foraminous forming carrier, such as a Fourdrinier wire, where it is freed of the copious water needed to disperse the fibrous slurry is generally transferred to a felt or fabric in a so-called press section where de-watering is continued either by mechanically compacting the paper or by some other de-watering method such as through-drying with hot air, before finally being transferred in the semi-dry condition to the surface of the Yankee for the drying to be completed.

The impact of the adhered web with the doctor blade is essential to impart to the paper web the properties which are sought by manufacturers. Of particular importance are softness, strength and bulk.

Softness is the tactile sensation perceived by the consumer as he/she holds a particular product, rubs it across his/her skin, or crumples it within his/her hand. This tactile sensation is provided by a combination of several physical properties. One of the most important physical properties related to softness is generally considered by those skilled in the art to be the stiffness of the paper web from which the product is made. Stiffness, in turn, is usually considered to be directly dependent on the strength of the web.

Strength is the ability of the product, and its constituent webs, to maintain physical integrity and to resist tearing, bursting, and shredding under use conditions.

Bulk, as used herein, refers to the inverse of the density of a tissue paper web. It is another important part of real and perceived performance of tissue paper webs. Enhancements in bulk generally add to the clothlike, absorbent perception. A portion of the bulk of a tissue paper web is imparted by creping.

The level of adhesion of the papermaking web to the dryer is also of vital importance as it relates to the control of the web in its travel in the space between the creping blade and the winder upon which a roll of the paper is being formed. Webs which are insufficiently adhered tend to cause poor control of the sheet with consequent difficulties in forming a uniform reel of paper. A loose sheet between the creper and the reel will result in wrinkles, foldovers, or weaving of the edges of the sheet in the rolled-up paper. Poorly formed rolls not only affect the reliability of the papermaking operation, but also the subsequent operations of tissue and towel manufacture in which the rolls are converted into the tissue and towel products.

The level of adhesion of the papermaking web to the dryer is also of vital importance as it relates to the drying of the web. Higher levels of adhesion reduce the impedance of heat transfer and cause the web to dry faster, enabling more energy efficient, higher speed operation.

However, the level of adhesion is not the sole factor determining product quality and manufacturing reliability. For example, some adhesives have been found to form a bond between the web and the doctor blade at the point of creping such that the web does not dislodge properly so that portions of the web remain adhered to the dryer and travel past the edge of the blade. This causes a defect in the web and often causes the web to break.

Further, while some amount of build up of adhesive on the dryer is essential, excessive build up or streaks can be formed with some types of adhesives. Streaks can cause differences in the profile of adhesion across the width of the dryer. This can result in humps or wrinkles in the finished roll of paper. A second doctor blade is often positioned after the creping blade in order to remove any excess creping adhesive and other residue left behind. This blade is referred to as a cleaning blade. Cleaning blades and creping blades must be changed at some frequency to prevent a streaky coating and loss of sheet control.

The term "doctorability" as used herein refers to the relative ease with which the web is dislodged from the dryer without producing defects or requiring frequent changes of blades to prevent excessive build-up.

One important characteristic of a creping adhesive is that it be rewettable. "Rewettability", as used herein, refers to the ability of the adhesive film remaining on the heated drying surface to be activated by the moisture contained in the semi-dry tissue web when the web is brought into contact with the heated drying surface. A marked increase in tack is indicative of a high rewettability. Rewettability is important because only a portion of the drying surface is normally covered with adhesive on a given rotation of the Yankee dryer. The majority of the adhesion of the sheet to the dryer occurs by means of the creping adhesive deposited in previous passes.

There is a natural tendency of paper making web to adhere to the cylindrical dryer owing to the build up of deposits of water-soluble components of the paper web. These water soluble components form an adhesive film which is re-wet at the point of transfer of the web to the cylindrical drum. The needs for specific level and type of adhesion however has induced considerable activity among researchers in the field. Consequently, a wide variety of creping adhesives are known in the art. The use of animal glue, for example, has long been known.

In addition, Bates, in U.S. Pat. No. 3,926,716 incorporated herein by reference, discloses a process for improving the adherence of webs comprising the step of applying an aqueous polyvinyl alcohol.

As Bates points out, the needs for specific adhesion of the web to the dryer drum are particularly demanding when the paper making process is of the pattern densified category. Pattern densified webs are characterized by zones of relatively high density dispersed within a high bulk field, including more recent advances wherein the zones of relatively high density are continuous and the high bulk field is discrete. One method of preparing pattern densified tissue paper webs is referred to as through air drying. Pattern densified webs offer particular challenge to the adherence of the paper web to the rotating drying cylinder. This is because the web is only secured to the dryer cylinder in the high density areas. This challenges the adherence not only because of the lower surface area of contact with the dryer, but also because the web must be delivered to the rotating cylinder at a relatively higher level of fiber consistency owing to the poorer efficiency of the cylindrical dryer arising from the lower contact area. A web which has been dried to a relatively higher fiber consistency is more difficult to adhere to the dryer because a lower amount of water is available to rewet the adhesive film at the point of transfer of the web to the dryer.

In another example, Soerens, in U.S. Pat. No. 4,501,640 incorporated herein by reference, discloses an adhesive which comprises an aqueous admixture of polyvinyl alcohol and a water-soluble, thermosetting, cationic polyamide-epihalohydrin resin.

While a number of adhesives including these examples have been disclosed and are available, no single adhesive or adhesive blend has provided a satisfactory combination of doctorability, rewettability, and level of adhesion.

Therefore, it is the object of the present invention to provide an adhesive for creping tissue paper and a process for applying it which overcome these limitations by offering an improved level of adhesion while maintaining doctorability.

These and other objects are obtained using the present invention as will be taught in the following disclosure.

SUMMARY OF THE INVENTION

The invention is an aqueous dispersion useful as a creping adhesive comprising a cationic starch.

The cationic starch has between about 0.001 and about 0.2 cationic substituents per anhydroglucose unit of starch. Preferably, cationic substituents are selected from the group consisting of tertiary aminoalkyl ethers, quaternary ammonium alkyl ethers and mixtures thereof.

The dispersion contains from about 90% to about 99.9% water and more preferably from about 95% to about 99.9% water.

Preferably the starch comprises between about 10% and about 70% of the dry weight of the dispersion with the dispersion further comprising a polyvinyl alcohol. The polyvinyl alcohol is preferably a partially hydrolyzed polyvinyl acetate with a degree of hydrolysis greater than about 80%, and, more preferably, from about 80% to about 95%.

The molecular weight range for the polyvinyl alcohol useful for the present invention is from about 90,000 to about 140,000. An indirect indicator of molecular weight is viscosity, as used herein, referring to that of a 4% aqueous dispersion of the polyvinyl alcohol at 20° C. The polyvinyl alcohol of the present invention preferably has a viscosity greater than about 20 centipoise and, most preferably greater than about 35 centipoise.

A further embodiment of the invention is an aqueous dispersion comprising the cationic starch and further comprising a water-soluble, thermosetting, cationic polyamide-epihalohydrin resin.

The polyamide-epihalohydrin resin preferably comprises the reaction product of an epihalohydrin and a polyamide containing secondary or tertiary amine groups. The epihalohydrin is preferably epichlorohydrin and the polyamide amine groups are preferably secondary amine groups derived from a polyalkylene polyamide and a saturated aliphatic dibasic carboxylic acid. The dibasic carboxylic acid preferably contains from about 3 to about 10 carbon atoms.

The mole ratio of epihalohydrin to secondary amine groups in the polyamide is preferably from about 0.5 to 1 to about 2 to 1.

Another preferred embodiment of the present invention is an aqueous dispersion comprising from about 90% to about 99.9% water and from about 10% to about 0.1% solids, with the solids comprising from about 10% to about 70% of the cationic starch, from about 20% to about 85% of the polyvinyl alcohol, and from about 5% to about 40% of the water soluble, thermosetting, cationic polyamide-epihalohydrin resin.

The invention further provides a process for creping tissue paper. The process comprises:

a) applying to a rotating creping cylinder an aqueous dispersion comprising from about 90% to about 99.9% water and from about 10% to about 0.1% solids, wherein said solids comprises a cationic starch having between about 0.001 and about 0.2 cationic substituents per anhydroglucose unit of startch;

b) pressing a tissue paper web against the creping cylinder to effect adhesion of the web to the surface of the cylinder; and c) dislodging the web from the creping cylinder by contact with a doctor blade.

Another preferred embodiment of the present invention is a process for creping tissue paper comprising:

a) applying to a rotating creping cylinder an aqueous dispersion comprising from about 90% to about 99.9% water and from about 10% to about 0.1% solids, wherein from about 50% to about 90% of said solids is a cationic starch having between about 0.001 and about 0.2 cationic substituents per anhydroglucose unit of starch, and from about 10% to about 50% of said solids is a water soluble, thermosetting, cationic polyamide-epihalohydrin resin;

b) pressing a tissue paper web against the creping cylinder to effect adhesion of the web to the surface of the cylinder; and c) dislodging the web from the creping cylinder by contact with a doctor blade.

Another preferred embodiment of the present invention is a process for creping tissue paper comprising:

a) applying to a rotating creping cylinder an aqueous dispersion comprising from about 90% to about 99.9% water and from about 10% to about 0.1% solids, wherein from about 10% to about 70% of said solids is a cationic starch having between about 0.001 and about 0.2 cationic substituents per anhydroglucose unit of starch, from about 5% to about 40% of said solids is a water soluble, thermosetting, cationic polyamide-epihalohydrin resin, and from about 20% to about 85% of said solids is a polyvinyl alcohol;

b) pressing a tissue paper web against the creping cylinder to effect adhesion of the web to the surface of the cylinder; and c) dislodging the web from the creping cylinder by contact with a doctor blade.

The total amount of applied creping adhesive is preferably from about 0.1 lb/ton to about 10 lb/ton based on the dry weight of the creping adhesive and the dry weight of the paper web. The unit lb/ton, as used herein, refers to the dry amount of creping adhesive measured in lbs relative to the dry amount of paper measured in tons.

The tissue web can be comprised of various types of natural fibers including wood pulps of chemical and mechanical types. The preferred embodiment comprises papermaking fibers of both hardwood and softwood types wherein at least about 50% of the papermaking fibers are hardwood and at least about 10% are softwood. The tissue web can also be comprised of particulate fillers.

In its preferred embodiment, the method is used to prepare tissue paper with a basis weight between about 10 $g/m^2$ and about 50 $g/m^2$ and, more preferably, between about 10 $g/m^2$ and about 30 $g/m^2$. The preferred density is between about 0.03 $g/cm^3$ and about 0.6 $g/cm^3$ and, more preferably, between about 0.05 $g/cm^3$ and 0.2 $g/cm^3$.

All percentages, ratios and proportions herein are by weight unless otherwise specified.

DETAILED DESCRIPTION OF THE INVENTION

Having described a milieu for the invention, the instant invention is now turned to with particularity in this detailed description and appended examples. This description is provided as an aid to understanding of the invention; but is not intended to limit the invention, which is defined by the claims which particularly point out and distinctly claim the subject matter regarded as the invention.

As used herein, the term "comprising" means that the various components, ingredients, or steps, can be conjointly employed in practicing the present invention. Accordingly, the term "comprising" encompasses the more restrictive terms "consisting essentially of" and "consisting of."

As used herein, the term "water soluble" refers to materials that are soluble in water to at least 3%, by weight, at 25° C.

As used herein, the terms "tissue paper web, paper web, web, paper sheet and paper product" all refer to sheets of paper made by a process comprising the steps of forming an aqueous papermaking furnish, depositing this furnish on a foraminous surface, such as a Fourdrinier wire, and removing the water from the furnish as by gravity or vacuum-assisted drainage, with or without pressing, and by evaporation, comprising the final steps of adhering the sheet in a semi-dry condition to the surface of a Yankee dryer, completing the water removal by evaporation to an essentially dry state, removal of the web from the Yankee dryer by means of a flexible creping blade, and winding the resultant sheet onto a reel.

The terms "multi-layered tissue paper web, multi-layered paper web, multi-layered web, multi-layered paper sheet and multi-layered paper product" are all used interchangeably in the art to refer to sheets of paper prepared from two or more layers of aqueous paper making furnish which are preferably comprised of different fiber types, the fibers typically being relatively long softwood and relatively short hardwood fibers as used in tissue paper making. The layers are preferably formed from the deposition of separate streams of dilute fiber slurries upon one or more endless foraminous surfaces. If the individual layers are initially formed on separate foraminous surfaces, the layers can be subsequently combined when wet to form a multi-layered tissue paper web.

As used herein, the term "single-ply tissue product" means that it is comprised of one ply of creped tissue; the ply can be substantially homogeneous in nature or it can be a multi-layered tissue paper web. As used herein, the term "multi-ply tissue product" means that it is comprised of more than one ply of creped tissue. The plies of a multi-ply tissue product can be substantially homogeneous in nature or they can be multi-layered tissue paper webs.

In its most general form, the invention is an aqueous dispersion useful as a creping adhesive comprising a cationic starch. The dispersion contains from about 90% to about 99.9% water and most preferably from about 95% to about 99.9% and the cationic starch has a degree of substitution ranging from about 0.001 to about 0.2 cationic substituents per anhydroglucose units of starch.

As used herein, the term "aqueous dispersion" refers to compositions consisting predominantly of water and containing at least one additional component homogeneously distributed throughout the composition. The essential element is the homogeneity of the composition. It is not necessary that all components be dissolved at the molecular level. Thus, the term "aqueous dispersions" encompasses the more restrictive term "aqueous solution".

As used herein the term "cationic starch" is defined as starch, as naturally derived, which has been further chemically modified to impart a cationic constituent moiety. Preferably the starch is derived from corn or potatoes, but can be derived from other sources such as rice, wheat, or tapioca. Starch from waxy maize also known industrially as amioca starch is particularly preferred. Amioca starch differs from common dent corn starch in that it is entirely amylopectin, whereas common corn starch contains both amylopectin and amylose. Various unique characteristics of amioca starch are further described in "Amioca—The Starch from Waxy Corn", H. H. Schopmeyer, Food Industries, December 1945, pp. 106–108.

Cationic starches can be divided into the following general classifications: (1) tertiary aminoalkyl ethers, (2) onium starch ethers including quaternary amines, phosphonium, and sulfonium derivatives, (3) primary and secondary aminoalkyl starches, and (4) miscellaneous (e.g., imino starches). New cationic products continue to be developed, but the tertiary aminoalkyl ethers and quaternary ammonium alkyl ethers are the main commercial types, and are preferred for use herein. Suitable starches are produced by National Starch and Chemical Company, (Bridgewater, N.J.) under the tradename, RediBOND®. Grades with cationic moieties only such as RediBOND 5320® and RediBOND 5327® are suitable, and grades with additional anionic functionality such as RediBOND 2005® are also suitable.

In one embodiment of the invention, the starch preferably comprises between about 10% and about 70% of the dry weight of the dispersion with about 30% to about 90% of the dry weight of the dispersion comprising a polyvinyl alcohol.

Any polyvinyl alcohol suitable to form an adhesive film can be employed in the present invention. The prior art, such as Bates, in U.S. Pat. No. 3,926,716 describes the types of polyvinyl alcohol particularly suitable for the application. Commercial supplies of polyvinyl alcohol in solid form can be obtained under several trademarks including Airvol®, a trademark of Air Products Company of Allentown, Pa. and Elvanol®, a trademark of E. I. duPont de Nemours of Wilmington, Del. These resins can be readily made down into water to form aqueous solutions which are easily sprayed for application to a Yankee dryer or to a semi-dry tissue web.

The polyvinyl alcohol is preferably a partially hydrolyzed polyvinyl acetate with a degree of hydrolysis greater than about 80%, and, more preferably, from about 80% to about 95%.

The molecular weight range for the polyvinyl alcohol useful for the present invention is from about 90,000 to about 140,000. An indirect indicator of molecular weight is viscosity, as used herein, referring to that of a 4% aqueous dispersion of the polyvinyl alcohol at 20° C. The polyvinyl alcohol of the present invention preferably has a viscosity greater than about 20 centipoise and, more preferably greater than about 35 centipoise.

In another embodiment of the invention, the dry weight of the aqueous dispersion comprises from about 50% to about 90% of the cationic starch while further comprising from about 10% to about 50% of a water-soluble, thermosetting, cationic polyamide-epihalohydrin resin.

The water-soluble, thermosetting, cationic polyamide-epihalohydrin resin comprises the reaction product of an epihalohydrin and a polyamide containing secondary amine groups or tertiary amine groups.

Commercial supplies of particularly preferred polyamide-epihalohydrin resins can be obtained under several trademarks including Kymene® and Crepetrol®, trademarks of Hercules Inc. of Wilmington, Del., and Unisoft® and Rezosol®, trademarks of Houghton International Inc. of Valley Forge, Pa. These resins are supplied as a concentrated solution in water and need only be diluted in order to be easily sprayed for application to a Yankee dryer or to a semi-dry tissue web.

The basic chemistry of preparation of the water soluble, thermosetting, cationic polyamide-epihalohydrin resin is thoroughly described in U.S. Pat. No. 2,926,116 issued to Kiem Feb. 23, 1960, U.S. Pat. No. 3,058,873 issued to Kiem, et al. on Oct. 16, 1962, and U.S. Pat. No. 3,772,076 issued to Kiem on Nov. 13, 1973, all of which are incorporated herein by reference.

Preferably, the polyamide-epichlorohydrin resin comprises a water-soluble polymeric reaction product of epichlorohydrin, and a water-soluble polyamide having secondary amine groups.

In the preparation of one particularly preferred resin, a dibasic carboxylic acid is first reacted with the polyalkylene polyamine, preferably in aqueous solution, under conditions suitable to produce a water soluble polyamide with the repeating units —NH($C_nH_{2n}$HN)$_x$—CORCO— where n and x are each 2 or more and R is the divalent hydrocarbon radical of the dibasic carboxylic acid containing from about 3–10 carbon atoms.

The preparation of the resin is then completed by reacting the water-soluble polyamide with an epihalohydrin, particularly epichlorohydrin, to form the water-soluble cationic polyamide-epihalohydrin thermosetting resin.

The polyamide secondary amine groups are preferably derived from a polyalkylene polyamine for example polyethylene polyamides, polypropylene polyamines or polybutylene polyamines and the like, with diethylenetriamine being preferred.

The dicarboxylic acid is one of the saturated aliphatic dibasic carboxylic acids containing from about 3 to about 10 carbon atoms such as succinic, adipic, azelaic, and the like, and mixtures thereof. Dicarboxylic acids containing from 4 to 8 carbon atoms preferred, with adipic acid being most preferred.

Preferably the mole ratio of polyalkylene to dibasic carboxylic acid is from about 0.8 to 1 to about 1.5 to 1.

The mole ratio of epihalohydrin to secondary amine groups in the polyamide is preferably from about 0.5 to 1 to about 2 to 1.

In another preferred aqueous dispersion according to the present invention, the dispersion comprises from about 90% to about 99.9% water and from about 10% to about 0.1% solids, with the solids comprising from bout 10% to about 70% of the cationic starch, from about 20% to about 85% of the polyvinyl alcohol, and from about 5% to about 40% of the water soluble, thermosetting, cationic polyamide-epihalohydrin resin.

The invention further provides a process for creping tissue paper. The process comprises:

a) applying to a rotating creping cylinder an aqueous dispersion comprising from about 90% to about 99.9% water and from about 10% to about 0.1% solids, wherein said solids comprises a cationic starch having between about 0.001 and about 0.2 cationic substituents per anhydroglucose unit of starch;

b) pressing a tissue paper web against the creping cylinder to effect adhesion of the web to the surface of the cylinder; and c) dislodging the web from the creping cylinder by contact with a doctor blade.

Another preferred embodiment of the present invention is a process for creping tissue paper comprising:

a) applying to a rotating creping cylinder an aqueous dispersion comprising from about 90% to about 99.9% water and from about 10% to about 0.1% solids, wherein from about 50% to about 90% of said solids is a cationic starch having between about 0.001 and about 0.2 cationic substituents per anhydroglucose unit of starch, and from about 10% to about 50% of said solids is a water soluble, thermosetting, cationic polyamide-epihalohydrin resin;

b) pressing a tissue paper web against the creping cylinder to effect adhesion of the web to the surface of the cylinder; and c) dislodging the web from the creping cylinder by contact with a doctor blade.

Another preferred embodiment of the present invention is a process for creping tissue paper comprising:

a) applying to a rotating creping cylinder an aqueous dispersion comprising from about 90% to about 99.9% water and from about 10% to about 0.1% solids, wherein from about 10% to about 70% of said solids is a cationic starch having between about 0.001 and about 0.2 cationic substituents per anhydroglucose unit of starch, from about 5% to about 40% of said solids is a water soluble, thermosetting, cationic polyamide-epihalohydrin resin, and from about 20% to about 85% of said solids is a polyvinyl alcohol;

b) pressing a tissue paper web against the creping cylinder to effect adhesion of the web to the surface of the cylinder; and c) dislodging the web from the creping cylinder by contact with a doctor blade.

The total amount of applied creping adhesive is preferably from about 0.1 lb/ton to about 10 lb/ton based on the dry weight of the creping adhesive and the dry weight of the paper web. The unit lb/ton, as used herein, refers to the dry amount of creping adhesive measured in lbs relative to the dry amount of paper measured in tons.

PREPARATION OF THE TISSUE PAPER WEB

Components of the Aqueous Papermaking Furnish

It is anticipated that wood pulp in all its varieties will normally comprise the papermaking fibers used in this invention. However, other cellulose fibrous pulps, such as cotton linters, bagasse, rayon, etc., can be used and none are disclaimed. Wood pulps useful herein include chemical pulps such as, sulfite and sulfate (sometimes called Kraft) pulps as well as mechanical pulps including for example, ground wood, ThermoMechanical Pulp (TMP) and Chemi-ThermoMechanical Pulp (CTMP). Pulps derived from both deciduous and coniferous trees can be used.

Both hardwood pulps and softwood pulps as well as combinations of the two may be employed as papermaking fibers for the tissue paper of the present invention. The term "hardwood pulps" as used herein refers to fibrous pulp derived from the woody substance of deciduous trees (angiosperms), whereas "softwood pulps" are fibrous pulps derived from the woody substance of coniferous trees (gymnosperms). Blends of hardwood Kraft pulps, especially eucalyptus, and northern softwood Kraft (NSK) pulps are particularly suitable for making the tissue webs of the present invention. Another preferred embodiment of the present invention comprises layered tissue webs wherein, most preferably, hardwood pulps such as eucalyptus are used for outer layer(s) and wherein northern softwood Kraft pulps are used for the inner layer(s). Also applicable to the present invention are fibers derived from recycled paper, which may contain any or all of the above categories of fibers.

Particulate fillers, including clay, calcium carbonate, titanium dioxide, talc, aluminum silicate, calcium silicate, alumina trihydrate, activated carbon, pearl starch, calcium sulfate, glass microspheres, diatomaceous earth, and mixtures thereof can also be included in the aqueous papermaking furnish.

Other materials, of which the following are examples, can be added to the aqueous papermaking furnish or the embryonic web to impart other characteristics to the product or improve the papermaking process so long as they do not interfere or counteract the advantages of the present invention.

It is sometimes useful, for purposes of retention and web strength to include starch as one of the ingredients of the aqueous papermaking furnish, especially cationic starch. Particularly suitable starches for this purpose are produced by National Starch and Chemical Company, (Bridgewater, N.J.) under the tradename, RediBOND®.

It is common to add a cationic charge biasing species to the papermaking process to control the zeta potential of the aqueous papermaking furnish as it is delivered to the papermaking process. One suitable material is Cypro 514®, a product of Cytec, Inc. of Stamford, Conn.

It is also common to add retention aids. Multivalent ions can be effectively added to the aqueous papermaking furnish in order to enhance the retention of fine particles which might otherwise remain suspended in the recirculating water system of the paper machine. The practice of adding alum, for example, has long been known. More recently, polymers which carry many charge sites along the chain length have been effectively employed for this purpose. Both anionic and cationic flocculants are expressly included within the scope of the present invention. Flocculants such as RETEN 235®, a product of Hercules, Inc. of Wilmington, Del. and Accurac 171®, a product of Cytec, Inc. of Stamford, Conn. are examples of anionic flocculants. Flocculants such as RETEN 157®, a product of Hercules, Inc. of Wilmington, Del. and Accurac 91®, a product of Cytec, Inc. of Stamford, Conn. are examples of acceptable cationic flocculants.

The use of high surface area, high anionic charge microparticles for the purposes of improving formation, drainage, strength, and retention is well taught in the art. See, for example, U.S. Pat. No. 5,221,435, issued to Smith on Jun. 22, 1993, incorporated herein by reference. Common materials for this purpose are silica colloid, or bentonite clay. The incorporation of such materials is expressly included within the scope of the present invention.

The advantages of the present invention are most particularly realized for grades of paper without permanent wet strength. Wet strength resins, particularly the polyamide-epichlorohydrin type which are more particularly detailed in other parts of this specification, often provide some degree of crepe control even when added to the aqueous papermaking furnish. However, these advantages often are accompanied by the presence of permanent wet strength in the product, a property which is often a liability and addition of the polyamide-epichlorohydrin in the wet end of the papermaking process is not as effective in promoting crepe benefits as can be achieved by using the polymer directly in the creping operation.

Creped paper products, which must have limited strength when wet because of the need to dispose of them through toilets into septic or sewer systems, require fugitive wet strength resins. Fugitive wet strength resins impart a wet strength which is characterized by a decay of part or all of its potency upon standing in presence of water. If fugitive wet strength is desired, the binder materials can be chosen from the group consisting of dialdehyde starch or other resins with aldehyde functionality such as Co-Bond 1000® offered by National Starch and Chemical Company, Parez 750® offered by Cytec of Stamford, Conn. and the resin described in U.S. Pat. No. 4,981,557 issued on Jan. 1, 1991, to Bjorkquist and incorporated herein by reference.

If enhanced absorbency is needed, surfactants may be used to treat the creped tissue paper webs of the present invention. The surfactants preferably have alkyl chains with eight or more carbon atoms. Exemplary anionic surfactants are linear alkyl sulfonates, and alkylbenzene sulfonates. Exemplary nonionic surfactants are alkylglycosides including alkylglycoside esters such as Crodesta SL-40® which is available from Croda, Inc. (New York, N.Y.); alkylglycoside ethers as described in U.S. Pat. No. 4,011,389, issued to W. K. Langdon, et al. on Mar. 8, 1977; and alkylpolyethoxylated esters such as Pegosperse 200 ML available from Glyco Chemicals, Inc. (Greenwich, Conn.) and IGEPAL RC-520® available from Rhone Poulenc Corporation (Cranbury, N.J.).

Chemical softening agents are expressly included as optional ingredients. Acceptable chemical softening agents comprise the well known dialkyldimethylammonium salts such as ditallowdimethylammonium chloride, ditallowdimethylammonium methyl sulfate, di(hydrogenated) tallow dimethyl ammonium chloride; with di(hydrogenated) tallow dimethyl ammonium methyl sulfate being preferred. This particular material is available commercially from Witco Chemical Company Inc. of Dublin, Ohio under the tradename Varisoft 137®. Biodegradable mono and di-ester variations of the quaternary ammonium compound can also be used and are within the scope of the present invention.

The above listings of optional chemical additives is intended to be merely exemplary in nature, and are not meant to limit the scope of the invention.

Preparation of the Aqueous Papermaking Furnish

Those skilled in the art will recognize that not only the qualitative chemical composition of the papermaking furnish is important to the creped papermaking process, but also the relative amounts of each component, and the sequence and timing of addition, among other factors. The following techniques are suitable in preparing the aqueous papermaking furnish, but its delineation should not be regarded as limiting the scope of the present invention, which is defined by the claims set forth at the end of this specification.

Papermaking fibers are first prepared by liberating the individual fibers into a aqueous slurry by any of the common pulping methods adequately described in the prior art. Refining, if necessary, is then carried out on the selected parts of the papermaking furnish.

In a preferred arrangement, a slurry of relatively short papermaking fibers, comprising hardwood pulp, is prepared, while a slurry of relatively long papermaking fibers is separately prepared. The fate of the resultant short fibered slurry is to be directed to the outer chambers of a three layered headbox to form surface layers of a three layered tissue in which a long fibered inner layer is formed out of a inner chamber in the headbox in which the slurry of relatively long papermaking fibers is directed. The resultant filled tissue web is particularly suitable for converting into a single-ply tissue product.

In an alternate preferred arrangement, the before-mentioned slurries of long and short fibers are formed and the fate of the resultant short fibered slurry is to be directed to one chamber of a two chambered headbox to form one layer of a two layered tissue in which a long fibered alternate layer is formed out of the second chamber in the headbox in which the slurry of relatively long papermaking fibers is directed. The resultant filled tissue web is particularly suitable for converting into a multi-ply tissue product comprising two plies in which each ply is oriented so that the layer comprised of relatively short papermaking fibers is on the surface of the two-ply tissue product.

Those skilled in the art will also recognize that the apparent number of chambers of a headbox can be reduced by directing the same type of aqueous papermaking furnish to adjacent chambers. For example, the before-mentioned three chambered headbox could be used as a two chambered headbox simply by directing essentially the same aqueous papermaking furnish to either of two adjacent chambers.

The Papermaking Process

Figure 1:
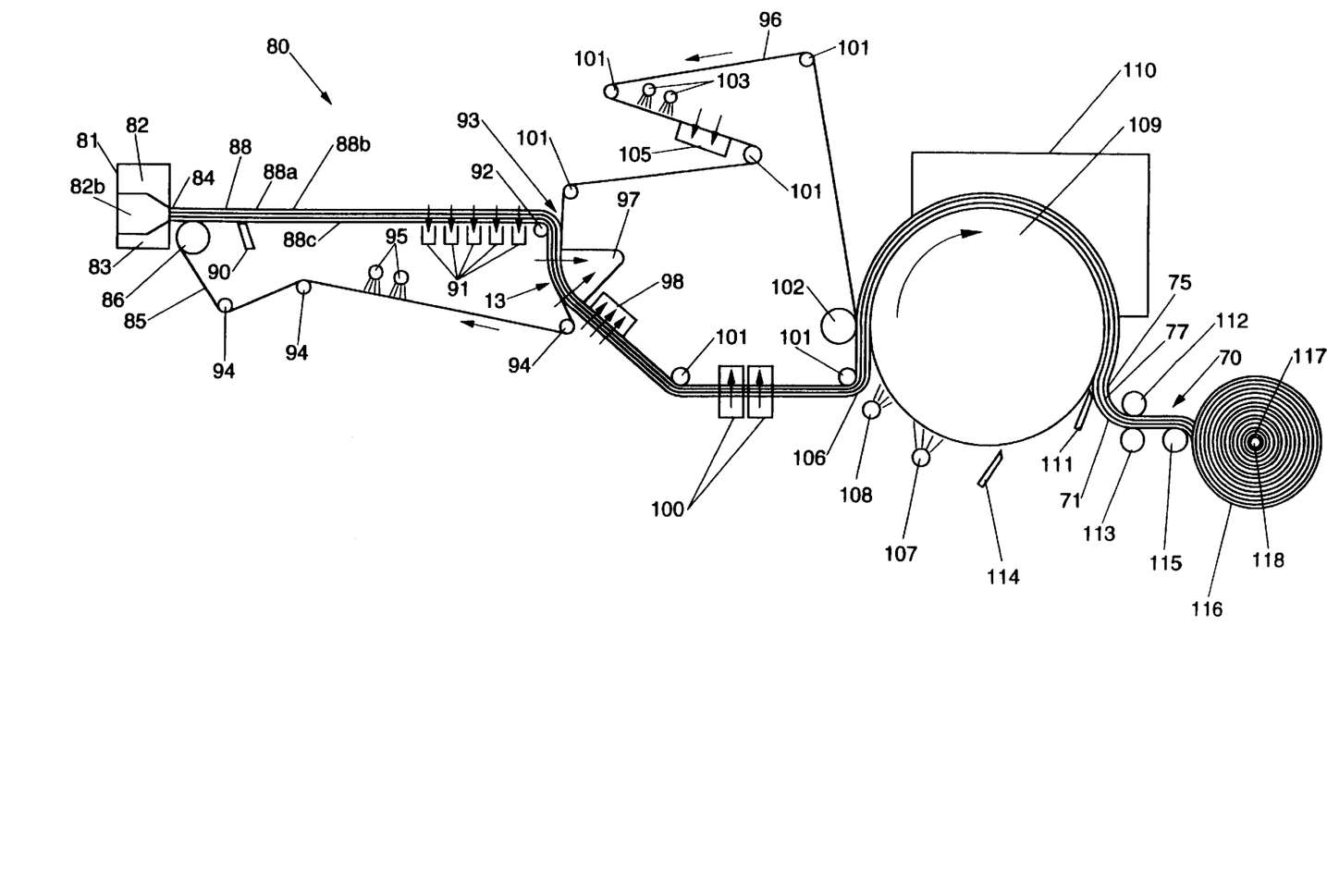
FIG. 1 is a schematic representation of the papermaking process incorporating the preferred embodiment of the present invention comprising the novel adhesive for dry creping tissue paper.

FIG. 1 is a schematic representation of the papermaking process incorporating the preferred embodiments of the present invention comprising the novel process for dry creping tissue paper. These preferred embodiments are described in the following discussion, wherein reference is made to FIG. 1.

FIG. 1 is a side elevational view of a preferred papermaking machine 80 for manufacturing paper according to the present invention. Referring to FIG. 1, papermaking machine 80 comprises a layered headbox 81 having a top chamber 82 a center chamber 82b, and a bottom chamber 83, a slice roof 84, and a Fourdrinier wire 85 which is looped over and about breast roll 86, deflector 90, vacuum suction boxes 91, couch roll 92, and a plurality of turning rolls 94. In operation, one papermaking furnish is pumped through top chamber 82 a second papermaking furnish is pumped through center chamber 82b, while a third furnish is pumped through bottom chamber 83 and thence out of the slice roof 84 in over and under relation onto Fourdrinier wire 85 to form thereon an embryonic web 88 comprising layers 88a, and 88b, and 88c. Dewatering occurs through the Fourdrinier wire 85 and is assisted by deflector 90 and vacuum boxes 91. As the Fourdrinier wire makes its return run in the direction shown by the arrow, showers 95 clean it prior to its commencing another pass over breast roll 86. At web transfer zone 93, the embryonic web 88 is transferred to a foraminous carrier fabric 96 by the action of vacuum transfer box 97. Carrier fabric 96 carries the web from the transfer zone 93 past vacuum dewatering box 98, through blow-through predryers 100 and past two turning rolls 101, forming semi-dry embryonic tissue paper web, 106, still supported by the foraminous carrier fabric, 96. After the web is transferred to a Yankee dryer 108 in a subsequent step, the carrier fabric 96 is then cleaned and dewatered as it completes its loop by passing over and around additional turning rolls 101, showers 103, and vacuum dewatering box 105.

Application of the Aqueous Dispersion of Creping Adhesive

The present invention employs the application of a creping adhesive comprising an aqueous dispersion of starch and optionally a polyvinyl alcohol and a water soluble, thermosetting, cationic polyamide-epihalohydrin resin.

Preferably the solids concentration of the aqueous dispersion is between about 0.1% and about 10% at the point of application. Most preferably, the solids concentration is between about 0.1% and about 5% at the point of application.

While various means of application of the creping adhesive are anticipated and none are disclaimed, the preferred method of application is by aqueous dispersion via a spray boom directed at the surface of the Yankee dryer prior to transfer of the semi-dry tissue paper web.

Referring to FIG. 1, the application point of the dispersion via this preferred embodiment is represented by spray boom 107.

The use of multiple spray booms each carrying ingredients comprising the present invention is specifically within the scope of the present invention.

For example, referring to FIG. 1, spray boom 108 is optional. If enabled, dispersions according to the present invention can be directed via spray boom 107 or 108 or both.

Pressing the Web Against the Creping Cylinder

In the present invention, the tissue paper web while in a semi-dry condition is pressed against a creping cylinder, most commonly a heated drying surface, so called a Yankee dryer, aided by means of the creping adhesives applied in the previous steps.

The web is secured by pressing it to the cylinder surface. Most preferably, pressure from an opposing cylindrical drum is provided to achieve a uniform adhesion of the semi-dry web to the dryer. Vacuum may also be applied to the web as it is pressed against the Yankee surface. Multiple Yankee dryer drums can also be employed in the present invention.

Referring to FIG. 1, the semi-dry tissue paper web is secured to the cylindrical surface of Yankee dryer 109 aided by adhesive applied by spray boom 107 and 108. Either boom 107 or 108 or both can apply an dispersion according to the present invention. Adhesion of the web is promoted by use of the opposing cylindrical steel drum, 102. Drying is completed on the steam heated Yankee dryer 109 and by hot air which is heated and circulated through drying hood 110 by means not shown. The web is then dry creped from the Yankee dryer 109 by doctor blade 111, so-called a creping blade, after which it is designated paper sheet 70 comprising a Yankee-side layer 71 a center layer 73, and an off-Yankee-side layer 75. Paper sheet 70 then passes between calender rolls 112 and 113, about a circumferential portion of reel 115, and thence is wound into a roll 116 on a core 117 disposed on shaft 118. The removal of excess coating from the dryer surface is effected by means of a second doctor blade, 114, so-called a cleaning blade.

Also, with respect to the process conditions for making exemplary paper sheet 70, the paper web is preferably dried to about 80% fiber consistency, and more preferably to about 96% fiber consistency prior to creping.

The present invention is applicable to creped tissue paper in general, including but not limited to conventionally felt-pressed creped tissue paper; high bulk pattern densified creped tissue paper; and high bulk, uncompacted creped tissue paper.

The creped tissue paper webs of the present invention have a basis weight of between 10 g/m$^2$ and about 100 g/m$^2$. In its preferred embodiment, the filled tissue paper of the present invention has a basis weight between about 10 g/m$^2$ and about 50 g/m$^2$ and, most preferably, between about 10 g/m$^2$ and about 30 g/m$^2$. Creped tissue paper webs suitable for the present invention possess a density of about 0.60 g/cm$^3$ or less. In its preferred embodiment, the filled tissue paper of the present invention has a density between about 0.03 g/cm$^3$ and about 0.6 g/cm$^3$ and, most preferably, between about 0.05 g/cm$^3$ and 0.2 g/cm$^3$.

The present invention is further applicable to multi-layered tissue paper webs. Tissue structures formed from layered paper webs are described in U.S. Pat. No. 3,994,771, Morgan, Jr. et al. issued Nov. 30, 1976, U.S. Pat. No. 4,300,981, Carstens, issued Nov. 17, 1981, U.S. Pat. No. 4,166,001, Dunning et al., issued Aug. 28, 1979, and European Patent Publication No. 0 613 979 A1, Edwards et al., published Sep. 7, 1994, all of which are incorporated herein by reference. The layers are preferably comprised of different fiber types, the fibers typically being relatively long softwood and relatively short hardwood fibers as used in multi-layered tissue paper making. Multi-layered tissue paper webs suitable for the present invention comprise at least two superposed layers, an inner layer and at least one outer layer contiguous with the inner layer. Preferably, the multi-layered tissue papers comprise three superposed layers, an inner or center layer, and two outer layers, with the inner layer located between the two outer layers. The two outer layers preferably comprise a primary filamentary constituent of relatively short paper making fibers having an average fiber length between about 0.5 and about 1.5 mm, preferably less than about 1.0 mm. These short paper making fibers typically comprise hardwood fibers, preferably hardwood Kraft fibers, and most preferably derived from eucalyptus. The inner layer preferably comprises a primary filamentary constituent of relatively long paper making fibers having an average fiber length of least about 2.0 mm. These long paper making fibers are typically softwood fibers, preferably, northern softwood Kraft fibers. Preferably, the majority of the particulate filler of the present invention is contained in at least one of the outer layers of the multi-layered tissue paper web of the present invention. More preferably, the majority of the particulate filler of the present invention is contained in both of the outer layers.

The creped tissue paper products made from single-layered or multi-layered creped tissue paper webs can be single-ply tissue products or multi-ply tissue products.

The equipment and methods are well known to those skilled in the art. In a typical process, a low consistency pulp furnish is provided in a pressurized headbox. The headbox has an opening for delivering a thin deposit of pulp furnish onto the Fourdrinier wire to form a wet web. The web is then typically dewatered to a fiber consistency of between about 7% and about 25% (total web weight basis) by vacuum dewatering.

More preferable variations of the papermaking process of the present invention include the so-called pattern densified methods in which the resultant structure is characterized by having a relatively high bulk field of relatively low fiber density and an array of densified zones of relatively high fiber density dispersed within the high bulk field. The high bulk field is alternatively characterized as a field of pillow regions. The densified zones are alternatively referred to as knuckle regions. The densified zones may be discretely spaced within the high bulk field or may be interconnected, either fully or partially, within the high bulk field. Preferably, the zones of relatively high density are continuous and the high bulk field is discrete. Preferred processes for making pattern densified tissue webs are disclosed in U.S. Pat. No. 3,301,746, issued to Sanford and Sisson on Jan. 31, 1967, U.S. Pat. No. 3,974,025, issued to Peter G. Ayers on Aug. 10, 1976, and U.S. Pat. No. 4,191,609, issued to Paul D. Trokhan on Mar. 4, 1980, and U.S. Pat. No. 4,637,859, issued to Paul D. Trokhan on Jan. 20, 1987, U.S. Pat. No. 4,942,077 issued to Wendt et al. on Jul. 17, 1990, European Patent Publication No. 0 617 164 A1, Hyland et al., published Sep. 28, 1994, European Patent Publication No. 0 616 074 A1, Hermans et al., published Sep. 21, 1994; all of which are incorporated herein by reference.

To form pattern densified webs, the web transfer step immediately after forming the web is to a forming fabric rather than a felt. The web is juxtaposed against an array of supports comprising the forming fabric. The web is pressed against the array of supports, thereby resulting in densified zones in the web at the locations geographically corresponding to the points of contact between the array of supports and the wet web. The remainder of the web not compressed during this operation is referred to as the high bulk field. This high bulk field can be further reduced in density by application of fluid pressure, such as with a vacuum type device or a blow-through dryer. The web is dewatered, and optionally predried, in such a manner so as to substantially avoid compression of the high bulk field. This is preferably accomplished by fluid pressure, such as with a vacuum type device or blow-through dryer, or alternately by mechanically pressing the web against an array of supports wherein the high bulk field is not compressed. The operations of dewatering, optional predrying and formation of the densified zones may be integrated or partially integrated to reduce the total number of processing steps performed. The moisture content of the semi-dry web at the point of transfer to the Yankee surface is less than about 40% and the hot air is forced through said semi-dry web while the semi-dry web is on said forming fabric to form a low density structure.

The pattern densified web is transferred to the Yankee dryer and dried to completion, preferably still avoiding mechanical pressing. In the present invention, preferably from about 8% to about 55% of the creped tissue paper surface comprises densified knuckles having a relative density of at least 125% of the density of the high bulk field.

The array of supports is preferably an imprinting carrier fabric having a patterned displacement of knuckles which operate as the array of supports which facilitate the formation of the densified zones upon application of pressure. The pattern of knuckles constitutes the array of supports previously referred to. Imprinting carrier fabrics are disclosed in U.S. Pat. No. 3,301,746, Sanford and Sisson, issued Jan. 31, 1967, U.S. Pat. No. 3,821,068, Salvucci, Jr. et al., issued May 21, 1974, U.S. Pat. No. 3,974,025, Ayers, issued Aug. 10, 1976, U.S. Pat. No. 3,573,164, Friedberg et al., issued Mar. 30, 1971, U.S. Pat. No. 3,473,576, Amneus, issued Oct. 21, 1969, U.S. Pat. No. 4,239,065, Trokhan, issued Dec. 16, 1980, and U.S. Pat. No. 4,528,239, Trokhan, issued Jul. 9, 1985, all of which are incorporated herein by reference.

Most preferably, the embryonic web is caused to conform to the surface of an open mesh drying/imprinting fabric by the application of a fluid force to the web and thereafter thermally predried on said fabric as part of a low density paper making process.

Another variation of the processing steps included within the present invention includes the formation of, so-called uncompacted, non pattern-densified multi-layered tissue paper structures such as are described in U.S. Pat. No. 3,812,000 issued to Joseph L. Salvucci, Jr. and Peter N. Yiannos on May 21, 1974 and U.S. Pat. No. 4,208,459, issued to Henry E. Becker, Albert L. McConnell, and Richard Schutte on Jun. 17, 1980, both of which are incorporated herein by reference. In general uncompacted, non pattern densified multi-layered tissue paper structures are prepared by depositing a paper making furnish on a foraminous forming wire such as a Fourdrinier wire to form a wet web, draining the web and removing additional water without mechanical compression until the web has a fiber consistency of at least 80%, and creping the web. Water is removed from the web by vacuum dewatering and thermal drying. The resulting structure is a soft but weak high bulk sheet of relatively uncompacted fibers. Bonding material is preferably applied to portions of the web prior to creping.

The advantages related to the practice of the present invention include the ability to improve the speed of the papermaking operation by virtue of improving the adhesion or control of the sheet between the creping blade and the reel.

While not wishing to be bound by theory, the following is an attempt to explain why the invention provides the advantageous adhesion. Cationic starch because of its cellulose-similar carbohydrate structure and its surface charge characteristic is a specific adhesive for cellulose pulp and is capable of producing quite high adhesive strengths. Further is rewettable. Further modification with either polyvinyl alcohol or a water soluble, cationic polyamide-epihalohydrin resin can improve the doctorability while retaining the high adhesive characteristics of the cationic starch.

The term "strength" as used herein refers to the total tensile strength, the determination method for this measure is included in a later section of this specification. The tissue paper webs according to the present invention are strong. This generally means that their total tensile strength is at least about 100 g/in, more preferably more than about 300 g/in.

The tissue paper web of this invention can be used in any application where soft, absorbent tissue paper webs are employed. Particularly advantageous uses of the tissue paper web of this invention are in toilet tissue and facial tissue products. Both single-ply and multi-ply tissue paper products can be produced from the webs of the present invention.

Analytical and Testing Procedures

A. Density

The density of multi-layered tissue paper, as that term is used herein, is the average density calculated as the basis weight of that paper divided by the caliper, with the appropriate unit conversions incorporated therein. Caliper of the multi-layered tissue paper, as used herein, is the thickness of the paper when subjected to a compressive load of 95 g/in$^2$ (15.5 g/cm$^2$).

B. Molecular Weight Determination

The essential distinguishing characteristic of polymeric materials is their molecular size. The properties which have enabled polymers to be used in a diversity of applications derive almost entirely from their macromolecular nature. In order to characterize fully these materials it is essential to have some means of defining and determining their molecular weights and molecular weight distributions. It is more correct to use the term relative molecular mass rather the molecular weight, but the latter is used more generally in polymer technology. It is not always practical to determine molecular weight distributions. However, this is becoming more common practice using chromatographic techniques. Rather, recourse is made to expressing molecular size in terms of molecular weight averages.

Molecular Weight Averages

If we consider a simple molecular weight distribution which represents the weight fraction ($w_i$) of molecules having relative molecular mass ($M_i$), it is possible to define several useful average values. Averaging carried out on the basis of the number of molecules ($N_i$) of a particular size ($M_i$) gives the Number Average Molecular Weight $$\overline{M}_n = \frac{\Sigma N_i M_i}{\Sigma N i}$$

An important consequence of this definition is that the Number Average Molecular Weight in grams contains Avogadro's Number of molecules. This definition of molecular weight is consistent with that of monodisperse molecular species, i.e. molecules having the same molecular weight. Of more significance is the recognition that if the number of molecules in a given mass of a polydisperse polymer can be determined in some way then $\overline{M}_n$, can be calculated readily. This is the basis of colligative property measurements.

Averaging on the basis of the weight fractions ($W_i$) of molecules of a given mass ($M_i$) leads to the definition of Weight Average Molecular Weights $$\overline{M}_w = \frac{\Sigma W_i N_i}{\Sigma W_i} = \frac{\Sigma N_i M_i^2}{\Sigma N_i M_i}$$

$\overline{M}_w$ is a more useful means for expressing polymer molecular weights than $\overline{M}_n$ since it reflects more accurately such properties as melt viscosity and mechanical properties of polymers and is therefor used in the present invention.

C. Measurement of Panel Softness of Tissue Papers

Ideally, prior to softness testing, the paper samples to be tested should be conditioned according to Tappi Method #T402OM-88. Here, samples are preconditioned for 24 hours at a relative humidity level of 10 to 35% and within a temperature range of 22 to 40° C. After this preconditioning step, samples should be conditioned for 24 hours at a relative humidity of 48 to 52% and within a temperature range of 22 to 24° C.

Ideally, the softness panel testing should take place within the confines of a constant temperature and humidity room. If this is not feasible, all samples, including the controls, should experience identical environmental exposure conditions.

Softness testing is performed as a paired comparison in a form similar to that described in "Manual on Sensory Testing Methods", ASTM Special Technical Publication 434, published by the American Society For Testing and Materials 1968 and is incorporated herein by reference. Softness is evaluated by subjective testing using what is referred to as a Paired Difference Test. The method employs a standard external to the test material itself. For tactile perceived softness two samples are presented such that the subject cannot see the samples, and the subject is required to choose one of them on the basis of tactile softness. The result of the test is reported in what is referred to as Panel Score Unit (PSU). With respect to softness testing to obtain the softness data reported herein in PSU, a number of softness panel tests are performed. In each test ten practiced softness judges are asked to rate the relative softness of three sets of paired samples. The pairs of samples are judged one pair at a time by each judge one sample of each pair being designated X and the other Y. Briefly, each X sample is graded against its paired Y sample as follows:

1. a grade of plus one is given if X is judged to may be a little softer than Y, and a grade of minus one is given if Y is judged to may be a little softer than X;
2. a grade of plus two is given if X is judged to surely be a little softer than Y, and a grade of minus two is given if Y is judged to surely be a little softer than X;
3. a grade of plus three is given to X if it is judged to be a lot softer than Y, and a grade of minus three is given if Y is judged to be a lot softer than X; and, lastly:
4. a grade of plus four is given to X if it is judged to be a whole lot softer than Y, and a grade of minus 4 is given if Y is judged to be a whole lot softer than X.

The grades are averaged and the resultant value is in units of PSU. The resulting data are considered the results of one panel test. If more than one sample pair is evaluated then all sample pairs are rank ordered according to their grades by paired statistical analysis. Then, the rank is shifted up or down in value as required to give a zero PSU value to which ever sample is chosen to be the zero-base standard. The other samples then have plus or minus values as determined by their relative grades with respect to the zero base standard. The number of panel tests performed and averaged is such that about 0.2 PSU represents a significant difference in subjectively perceived softness.

D. Measurement of Strength of Tissue Papers

DRY TENSILE STRENGTH:

The tensile strength is determined on one inch wide strips of sample using a Thwing-Albert Intelect II Standard Tensile Tester (Thwing-Albert Instrument Co., 10960 Dutton Rd., Philadelphia, Pa., 19154). This method is intended for use on finished paper products, reel samples, and unconverted stocks.

SAMPLE CONDITIONING AND PREPARATION:

Prior to tensile testing, the paper samples to be tested should be conditioned according to Tappi Method #T402OM-88. All plastic and paper board packaging materials must be carefully removed from the paper samples prior to testing. The paper samples should be conditioned for at least 2 hours at a relative humidity of 48 to 52% and within a temperature range of 22 to 24° C. Sample preparation and all aspects of the tensile testing should also take place within the confines of the constant temperature and humidity room.

For finished product, discard any damaged product. Next, remove 5 strips of four usable units (also termed sheets) and stack one on top to the other to form a long stack with the perforations between the sheets coincident. Identify sheets 1 and 3 for machine direction tensile measurements and sheets 2 and 4 for cross direction tensile measurements. Next, cut through the perforation line using a paper cutter (JDC-1-10 or JDC-1-12 with safety shield from Thwing-Albert Instrument Co., 10960 Dutton Road, Philadelphia, Pa., 19154) to make 4 separate stocks. Make sure stacks 1 and 3 are still identified for machine direction testing and stacks 2 and 4 are identified for cross direction testing.

Cut two 1" wide strips in the machine direction from stacks 1 and 3. Cut two 1" wide strips in the cross direction from stacks 2 and 4. There are now four 1" wide strips for machine direction tensile testing and four 1" wide strips for cross direction tensile testing. For these finished product samples, all eight 1" wide strips are five usable units (also termed sheets) thick.

For unconverted stock and/or reel samples, cut a 15" by 15" sample which is 8 plies thick from a region of interest of the sample using a paper cutter (JDC-1-10 or JDC-1-12 with safety shield from Thwing-Albert Instrument Co., 10960 Dutton Road, Philadelphia, Pa., 19154) . Make sure one 15" cut runs parallel to the machine direction while the other runs parallel to the cross direction. Make sure the sample is conditioned for at least 2 hours at a relative humidity of 48 to 52% and within a temperature range of 22 to 24° C. Sample preparation and all aspects of the tensile testing should also take place within the confines of the constant temperature and humidity room.

From this preconditioned 15" by 15" sample which is 8 plies thick, cut four strips 1" by 7" with the long 7" dimension running parallel to the machine direction. Note these samples as machine direction reel or unconverted stock samples. Cut an additional four strips 1" by 7" with the long 7" dimension running parallel to the cross direction. Note these samples as cross direction reel or unconverted stock samples. Make sure all previous cuts are made using a paper cutter (JDC-1-10 or JDC-1-12 with safety shield from Thwing-Albert Instrument Co., 10960 Dutton Road, Philadelphia, Pa., 19154). There are now a total of eight samples: four 1" by 7" strips which are 8 plies thick with the 7" dimension running parallel to the machine direction and four 1" by 7" strips which are 8 plies thick with the 7" dimension running parallel to the cross direction.

OPERATION OF TENSILE TESTER:

For the actual measurement of the tensile strength, use a Thwing-Albert Intelect II Standard Tensile Tester (Thwing- Albert Instrument Co., 10960 Dutton Rd., Philadelphia, Pa., 19154). Insert the flat face clamps into the unit and calibrate the tester according to the instructions given in the operation manual of the Thwing-Albert Intelect II. Set the instrument crosshead speed to 4.00 in/min and the 1st and 2nd gauge lengths to 2.00 inches. The break sensitivity should be set to 20.0 grams and the sample width should be set to 1.00" and the sample thickness at 0.025".

A load cell is selected such that the predicted tensile result for the sample to be tested lies between 25% and 75% of the range in use. For example, a 5000 gram load cell may be used for samples with a predicted tensile range of 1250 grams (25% of 5000 grams) and 3750 grams (75% of 5000 grams). The tensile tester can also be set up in the 10% range with the 5000 gram load cell such that samples with predicted tensiles of 125 grams to 375 grams could be tested.

Take one of the tensile strips and place one end of it in one clamp of the tensile tester. Place the other end of the paper strip in the other clamp. Make sure the long dimension of the strip is running parallel to the sides of the tensile tester. Also make sure the strips are not overhanging to the either side of the two clamps. In addition, the pressure of each of the clamps must be in full contact with the paper sample.

After inserting the paper test strip into the two clamps, the instrument tension can be monitored. If it shows a value of 5 grams or more, the sample is too taut. Conversely, if a period of 2–3 seconds passes after starting the test before any value is recorded, the tensile strip is too slack.

Start the tensile tester as described in the tensile tester instrument manual. The test is complete after the crosshead automatically returns to its initial starting position. Read and record the tensile load in units of grams from the instrument scale or the digital panel meter to the nearest unit.

If the reset condition is not performed automatically by the instrument, perform the necessary adjustment to set the instrument clamps to their initial starting positions. Insert the next paper strip into the two clamps as described above and obtain a tensile reading in units of grams. Obtain tensile readings from all the paper test strips. It should be noted that readings should be rejected if the strip slips or breaks in or at the edge of the clamps while performing the test.

CALCULATIONS:

For the four machine direction 1" wide finished product strips, sum the four individual recorded tensile readings. Divide this sum by the number of strips tested. This number should normally be four. Also divide the sum of recorded tensiles by the number of usable units per tensile strip. This is normally five for both 1-ply and 2-ply products.

Repeat this calculation for the cross direction finished product strips.

For the unconverted stock or reel samples cut in the machine direction, sum the four individual recorded tensile readings. Divide this sum by the number of strips tested. This number should normally be four. Also divide the sum of recorded tensiles by the number of usable units per tensile strip. This is normally eight.

Repeat this calculation for the cross direction unconverted or reel sample paper strips.

All results are in units of grams/inch (g/in).

EXAMPLES

The following examples are offered to illustrate the practice of the present invention. The examples are intended to aid in the description of the present invention, but, in no way, should be interpreted as limiting the scope thereof. The present invention is bounded only by the appended claims.

First, an aqueous slurry of Northern Softwood Kraft (NSK) of about 3% consistency is made up using a conventional pulper and is passed through a stock pipe toward the headbox of the Fourdrinier.

In order to impart a temporary wet strength to the finished product, a 1% dispersion of Co-BOND 1000® is prepared and is added to the NSK stock pipe at a rate sufficient to deliver 1% Co-BOND 1000®) based on the dry weight of the NSK fibers. The absorption of the temporary wet strength resin is enhanced by passing the treated slurry through an in-line mixer.

The NSK slurry is diluted with white water to about 0.2% consistency at the fan pump.

An aqueous slurry of eucalyptus fibers of about 3% by weight is made up using a conventional repulper.

The eucalyptus is passed through a stock pipe to another fan pump where it is diluted with white water to a consistency of about 0.2%.

The slurries of NSK and eucalyptus are directed into a multi-channeled headbox suitably equipped with layering leaves to maintain the streams as separate layers until discharge onto a traveling Fourdrinier wire. A three-chambered headbox is used. The eucalyptus slurry containing 80% of the dry weight of the ultimate paper is directed to chambers leading to each of the two outer layers, while the NSK slurry comprising 20% of the dry weight of the ultimate paper is directed to a chamber leading to a layer between the two eucalyptus layers. The NSK and eucalyptus slurries are combined at the discharge of the headbox into a composite slurry.

The composite slurry is discharged onto the traveling Fourdrinier wire and is dewatered assisted by a deflector and vacuum boxes.

The embryonic wet web is transferred from the Fourdrinier wire, at a fiber consistency of about 15% at the point of transfer, to a patterned forming fabric of a 5-shed, satin weave configuration having 84 machine-direction and 76 cross-machine-direction monofilaments per inch, respectively, and about 36% knuckle area.

Further de-watering is accomplished by vacuum assisted drainage until the web has a fiber consistency of about 28%.

While remaining in contact with the patterned forming fabric, the patterned web is pre-dried by air blow-through to a fiber consistency of about 62% by weight.

The semi-dry web is then adhered to the surface of a 10 ft diameter Yankee dryer aided by a sprayed creping adhesive comprising a 0.25% aqueous solution of the composition selected from the following table. The selected compositions represent Examples 1–8. Examples 1, 2, and 3 correspond to polyvinyl alcohol and mixtures of polyvinyl alcohol and polyamide-epichlorohydrin resin described in prior art. Examples 4, 5, 6, 7 and 8 are compositions according to the present invention.

The experiment is designed as a three-variable mixture designed experiment and the compositions are selected for application to the Yankee dryer according to a random sequence.

| Example Number | Polyvinyl Alcohol | Cationic Starch | Polyamide-epichlorohydrin (PAE) resin |
|---|---|---|---|
| 1 | 100% | 0% | 0% |
| 2 | 70% | 0% | 30% |
| 3 | 85% | 0% | 15% |
| 4 | 0% | 70% | 30% |

-continued

| Example Number | Polyvinyl Alcohol | Cationic Starch | Polyamide-epichlorohydrin (PAE) resin |
|---|---|---|---|
| 5 | 0% | 100% | 0% |
| 6 | 0% | 85% | 15% |
| 7 | 50% | 50% | 0% |
| 8 | 35% | 35% | 30% |

The polyvinyl alcohol is Airvol 540® obtained from Air Products Company of Allentown, Pa.

The cationic starch is RediBOND 5320® obtained from National Starch and Chemical Company of Bridgewater, N.J.

The polyamide-epichlorohydrin resin is Kymene 557H® obtained from Hercules Inc. of Wilmington, Del.

The selected creping adhesive is sprayed onto to the Yankee surface through a spray boom equipped with three nozzles spaced across the width of the dryer. The nozzles are model number 650050 obtained from Spraying Systems of Wheaton, Ill. The nozzles are directed toward the dryer surface and are located about 25 cm from the surface. The boom is positioned about 1 meter from the point at which the semi-dry web is contacted to the Yankee. The boom is pressurized at about 100 psi. At this level of pressure, the spray nozzles deliver creping adhesive at a rate of about 1.7 lb/ton creping adhesive solids based on the dry weight of the web.

The fiber consistency is increased to about 96% before the web is dry creped from the Yankee with a doctor blade.

The doctor blade has a bevel angle of about 25 degrees and is positioned with respect to the Yankee dryer to provide an impact angle of about 81 degrees.

The percent crepe is adjusted to about 18% by operating the Yankee dryer at about 800 fpm (feet per minute) (about 244 meters per minute), while the dry web is formed into roll at a speed of 656 fpm (201 meters per minutes).

A web tensiometer placed on the web traveling between the creping blade and the reel detects the tension in the sheet to measure the degree of adhesion of the web to the dryer.

The finished web is converted into a three-layer, single-ply creped patterned densified tissue paper product of about 18 lb per 3000 ft$^2$ basis weight.

Results of the web tension measurement for each adhesive formulation are modeled using a multi-variable regression. All first and second order terms possible using the three input variables are included in the regression, but terms with less than 95% probability of significance are removed in a stepwise fashion until all remaining terms are statistically significant at a 95% confidence interval. This results in the following web tension model:

Web Tension =

% $PVOH \times 0.26 +$ % Cationic Starch $\times 0.31 +$ % $PAE \times 0.81 -$

% $PAE \times$ % $PVOH \times 0.70 -$ % $PAE \times$ % Cationic Starch $\times 0.56$, in which %PVOH, % Cationic Starch, and % PAE, represent the values for the percentage of polyvinyl alcohol, cationic starch, and polyamide-epichlorohydrin resin, respectively composing the solids fraction of the aqueous dispersion applied as the creping adhesive.

Using this model, the following web tension values correspond to the adhesive formulations of the examples:

| Example Number | Polyvinyl Alcohol | Cationic Starch | Polyamide-epichlorohydrin (PAE) resin | Web Tension (g/in) |
|---|---|---|---|---|
| 1 | 100% | 0% | 0% | 25.8 |
| 2 | 70% | 0% | 30% | 27.7 |
| 3 | 85% | 0% | 15% | 25.2 |
| 4 | 0% | 70% | 30% | 34.5 |
| 5 | 0% | 100% | 0% | 31.0 |
| 6 | 0% | 85% | 15% | 31.5 |
| 7 | 50% | 50% | 0% | 28.4 |
| 8 | 35% | 35% | 30% | 31.1 |

The above results indicate that the dispersions according to the invention (Examples 4, 5, 6, 7, and 8) yield higher web adhesion than the prior art dispersions of Examples 1, 2, and 3. Example 8 displays a particularly good balance of adhesion and doctorability.

What is claimed is:

1. A process for creping tissue paper comprising:
   a) applying to a rotating creping cylinder an aqueous dispersion comprising from about 90% to about 99.9% water and from about 10% to about 0.1% solids, wherein from about 50% to about 90% of said solids is a cationic starch having between about 0.001 and about 0.2 cationic substituents per anhydroglucose unit of starch, and from about 10% to about 50% of said solids is a water soluble, thermosetting, cationic polyamide-epihalohydrin resin;
   b) pressing a tissue paper web against the creping cylinder to effect adhesion of the web to the surface of the cylinder; and
   c) dislodging the web from the creping cylinder by contact with a doctor blade.

2. A process for creping tissue paper comprising:
   a) applying to a rotating creping cylinder an aqueous dispersion comprising from about 90% to about 99.9% water and from about 10% to about 0.1% solids, wherein from about 10% to about 70% of said solids is a cationic starch having between about 0.001 and about 0.2 cationic substituents per anhydroglucose unit of starch, from about 5% to about 40% of said solids is a water soluble, thermosetting, cationic polyamide-epihalohydrin resin, and from about 20% to about 85% of said solids is a polyvinyl alcohol.
   b) pressing a tissue paper web against the creping cylinder to effect adhesion of the web to the surface of the cylinder; and
   c) dislodging the web from the creping cylinder by contact with a doctor blade.

3. The process of claim 2 wherein said polyamide-epihalohydrin resin comprises the reaction product of an epihalohydrin and a polyamide containing secondary amine groups or tertiary amine groups.

4. The process of claim 3 wherein said polyamide-epihalohydrin resin comprises the reaction product of an epihalohydrin and a polyamide containing secondary amine groups, the mole ratio of epihalohydrin to secondary amine groups of said polyamide being from about 0.5 to 1 to about 2 to 1.

5. The process of claim 4 wherein said polyamide containing secondary amine groups is obtained by reacting a $C_3$–$C_{10}$ saturated aliphatic dibasic carboxylic acid and a polyalkylene polyamine in a mole ratio of polyalkylene to dibasic carboxylic acid of from about 0.8 to 1 to about 1.5 to 1.

6. The process of claim 5 wherein the water soluble, thermosetting, cationic polyamide-epihalohydrin resin comprises the reaction product of an epihalohydrin and a polyamide precursor containing the recurring group —NH($C_nH_{2n}$HN)$_x$—CORCO— wherein n and x are each 2 or more and R is a saturated aliphatic chain having 3–10 carbon atoms.

7. The process of claim 5 wherein said epihalohydrin is epichlorohydrin.

8. The process of claim 7 wherein said aliphatic dibasic carboxylic acid is adipic acid.

9. The process of claim 8 wherein said polyalkylene polyamine is diethylenetriamine.

* * * * *